United States Patent [19]

Straka

[11] Patent Number: 4,935,638
[45] Date of Patent: Jun. 19, 1990

[54] SIDE BAR ASSEMBLY FOR VEHICLES SUCH AS PICK-UP TRUCKS, OFF-ROAD VEHICLES AND THE LIKE

[75] Inventor: Michael J. Straka, Newburgh, N.Y.

[73] Assignee: Sparkomatic Corporation, Milford, Pa.

[21] Appl. No.: 344,124

[22] Filed: Apr. 27, 1989

[51] Int. Cl.$^5$ ............................................. B60R 3/00
[52] U.S. Cl. ................................. 280/164.1; 280/163; 280/770; 297/75; 403/289
[58] Field of Search ................... 280/163, 164.1, 164.2, 280/169, 770, 762, 291, 756; 180/217, 219; 296/75, 207; 182/92, 112, 127; 403/289

[56] References Cited

U.S. PATENT DOCUMENTS 4,148,504  4/1979  Rushing .............................. 280/756

FOREIGN PATENT DOCUMENTS 101826  6/1983  Japan .................................. 180/219

OTHER PUBLICATIONS

J. C. Whitney & Company, 1985, p. 53.
Page 9 of prior (date unknown) catalog of Rally Accessories, Inc, of Miami, Florida.

*Primary Examiner*—Charles A. Marmor
*Assistant Examiner*—Eric Culbreth
*Attorney, Agent, or Firm*—Mason, Fenwick & Lawrence

[57] ABSTRACT

A side bar assembly for attachment to a chassis of different sizes of pick-up trucks, the side bar assembly including a pair of substantially L-shaped tubular members forming half-bar tube sections to collectively form a generally U-shaped side bar to extend laterally from a side of the vehicle, and a cylindrical connector sleeve having a central bore corresponding substantially to the outer diameter of the tube legs to receive the latter therein in alignment with each other with the connector sleeve encircling the adjacent portions of the tube legs over more than half the circumferential extent of each and a pair of mounting brackets to receive end portions of the side bar legs therein. The connector sleeve also includes a thickened portion defining an upwardly facing flat step surface at the top of the sleeve.

2 Claims, 2 Drawing Sheets

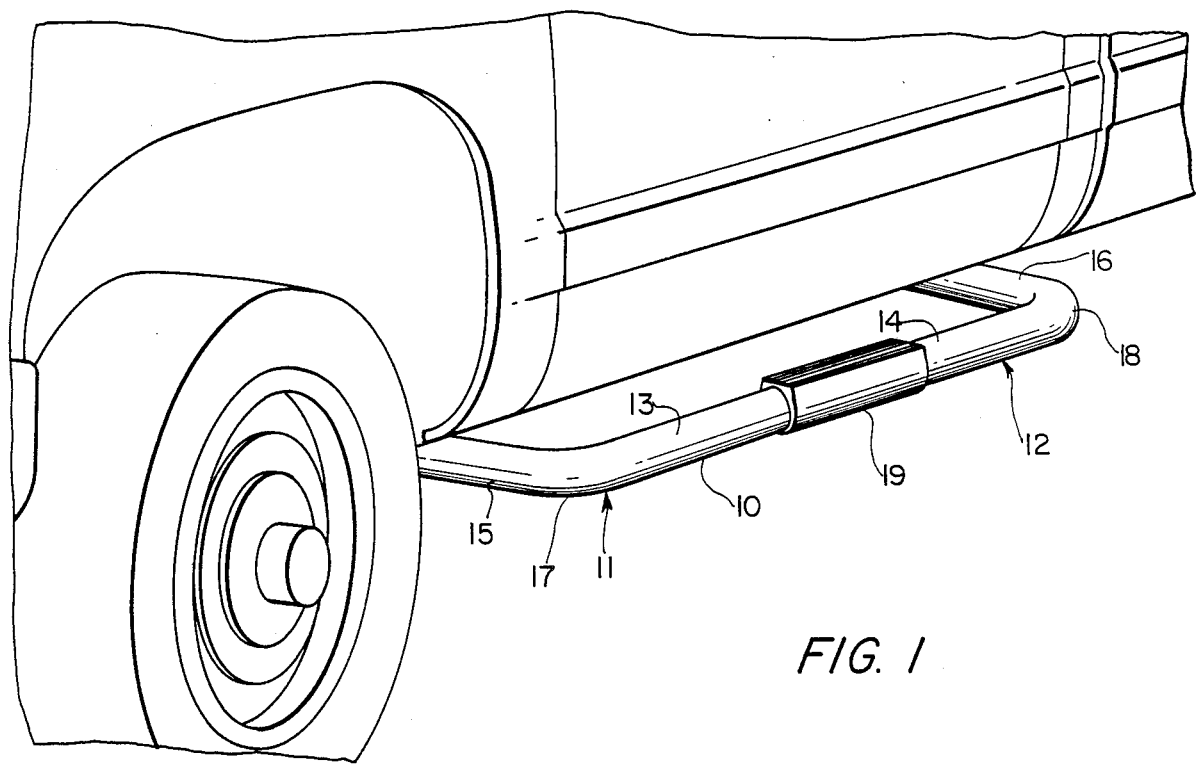
FIG. 1
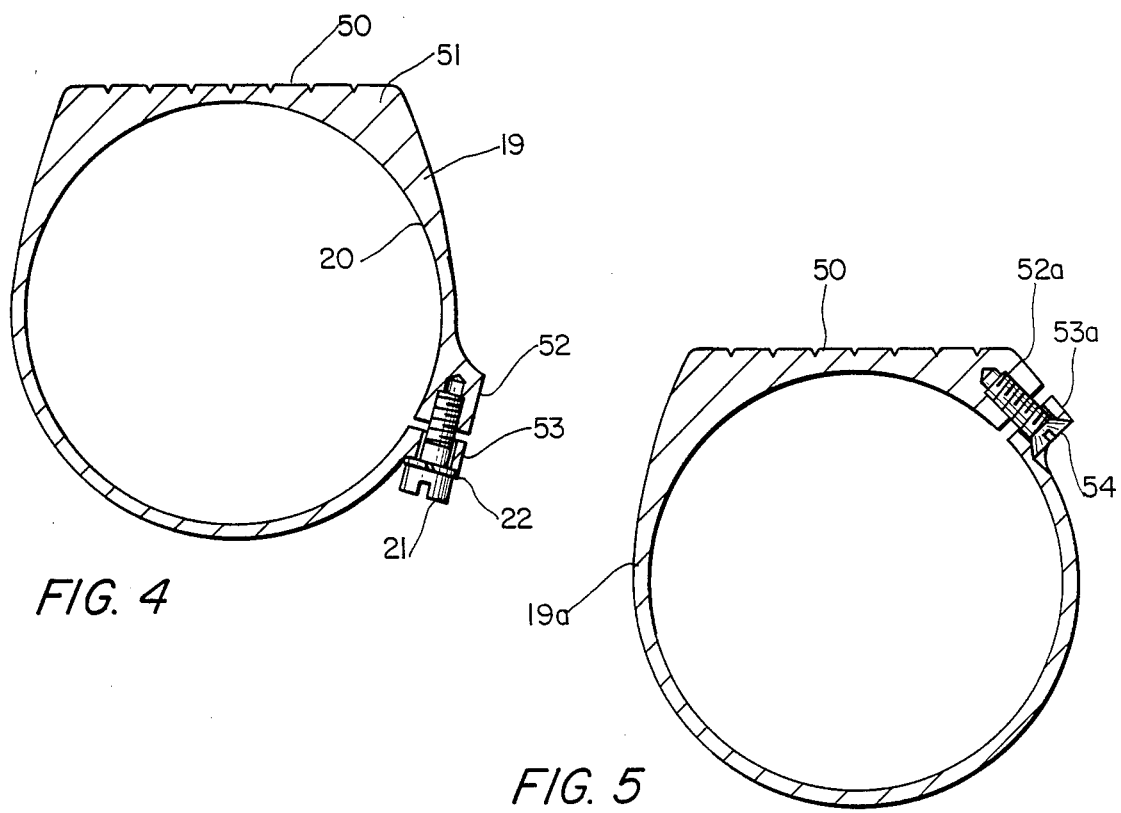
FIG. 4
FIG. 5

SIDE BAR ASSEMBLY FOR VEHICLES SUCH AS PICK-UP TRUCKS, OFF-ROAD VEHICLES AND THE LIKE

BACKGROUND AND OBJECTS OF THE INVENTION

The present invention relates in general to automotive side bars for pick-up trucks, jeeps and similar off-road vehicles.

An automotive side bar, sometimes called a step rail, is one of the pick-up truck or off-road vehicle accessories which has gained considerable popularity recently. In essence, it is a wide U-shaped tubular bar which is attached to the side of a vehicle just below the passenger cab. It usually covers the length of the cab and projects laterally to the outside of the cab side or door surface. It is usually bolted or welded to the main longitudinal frame beam of the vehicle chassis.

The side bar is an appearance accessory as well as a functional side step and/or a protective device for the door and side of the vehicle cab to deflect brush, for example, in an off-road situation.

Side bars have been manufactured and sold for some time, primarily by small off-road equipment outfits, and now are available in a limited way from larger automotive accessory companies. Side bars, to the best of applicant's knowledge, as available on the market today, are "fixed dimension" products individually designed for a specific vehicle type. Separate side bars of such "fixed dimension" types with different dimensions and/or mounting systems are typically manufactured for different vehicle makes and models, and consequently the supplier is required to stock a large number of different side bar stocking units. The side bar system of the present invention, in contrast with available fixed dimension designs of numerous sizes, is a single product kit adaptable to fit a large variety of pick-up trucks and similar vehicle regardless of the vehicles make, size or model.

More particularly, side bars require mounting on the main longitudinal frame beam of the vehicle chassis because only the main beam is strong enough to support forces which may be applied to the side bar. The overall size of the side bar, both its length and depth, is affected by many different factors. The length is given mainly by the size of the cab but it is also affected by the availability of suitable unobstructed surface on the vehicle chassis frame. The depth of a side bar is given by the distance from the main frame to the outside of the vehicle cab. This distance may be different at various places on the same vehicle.

The design of pick-up truck chassis naturally varies, not only among different makes and sizes of vehicles, but also may vary among truck models of the same make and size. This is caused by the availability of different cab sizes which may require different cab support members off the main frame or by optional equipment which may be mounted to the vehicle chassis, or by other variations such as a two-wheel/four-wheel drive or load carrying capabilities, etc. In addition, the main beams of vehicle chassis are linear in some cases and angled either up or down or in or out in others.

Because of all these complications, a typical side bar as available on the market at the present time is a one piece U-shaped tube of a specific length and depth dimensioned to fit a specific make, size and model of a vehicle. Accessory producers typically limit the availability of side bar to the most popular pick-up trucks because many retails stores are not willing to carry a very large inventory of such side bar stocking units.

Another object of the present invention is the provision of a side bar kit or assembly as a single stocking unit applicable to a wide variety of vehicles because of the adjustable design. This greatly simplifies the manufacture and the resulting cost of the item, as well as simplifying distribution and warehousing, and significantly minimizes demand on expensive retail store storage and display floor space. Important benefits are also available to a customer from the applicants adjustable design, as the customer is able to obtain a product for his vehicle directly from a local mass merchandise store.

Other objects, advantages and capabilities of the present invention will become apparent from the following detailed description, taken in conjunction with the accompanying drawings illustrating a preferred embodiment of the invention.

BRIEF DESCRIPTION OF THE FIGURES

FIG. 1 is a perspective view of a side bar assembly constructed in accordance with the present invention, shown mounted on adjacent portions of a vehicle such as a pick-up truck, off road vehicle or the like;

FIGS. 4 and 5 are vertical section views, taken along the section plane indicated at 4—4 in FIG. 2, showing two forms of the connector sleeve assembly.

DETAILED DESCRIPTION OF PREFERRED EMBODIMENTS

Figure 2:
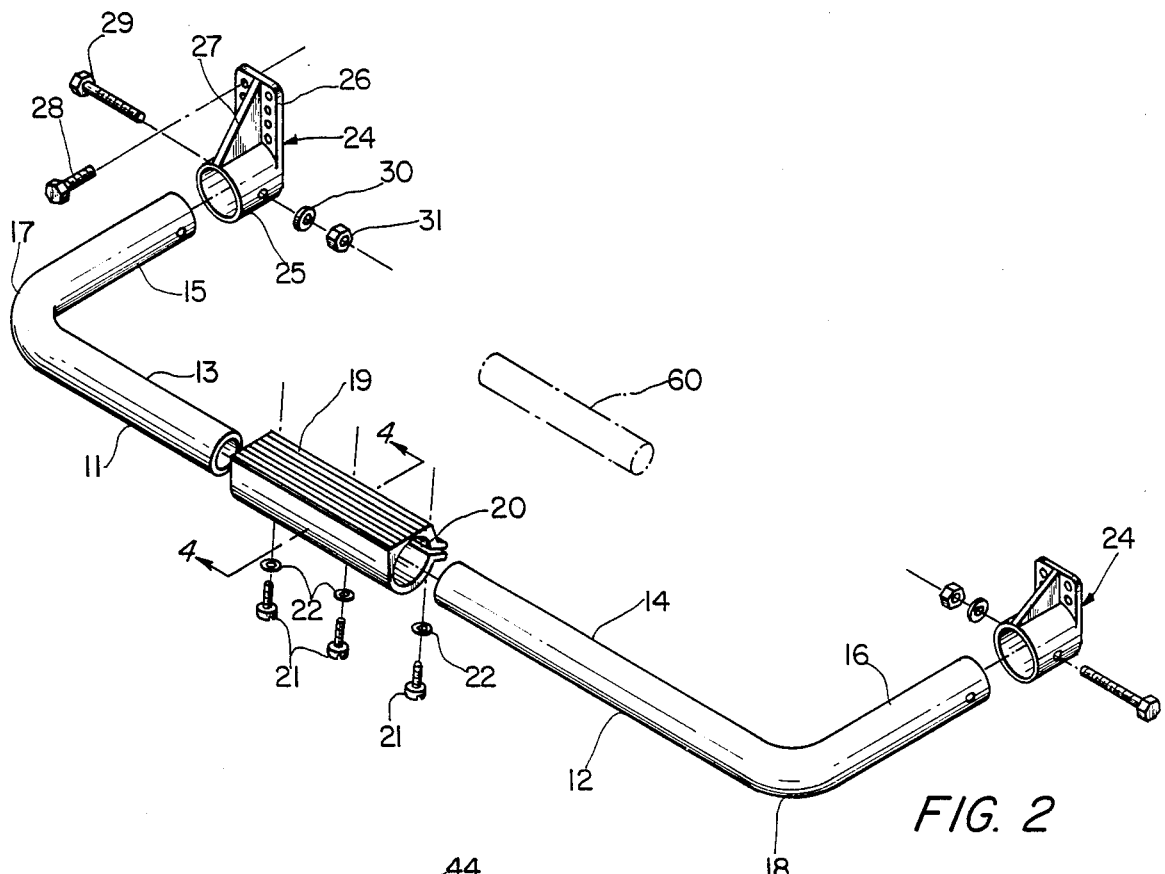
FIG. 2 is an exploded perspective view of the side bar assemblies.

Referring to the drawing, wherein like reference characters designate corresponding parts throughout the several parts, the adjustable side bar assembly for pick-up trucks, off road vehicles and the like, embodying the present invention, is indicated generally by the reference character 10, and is shown in FIG. 1 at one side of the vehicle. It will be understood either one side bar assembly may be provided for one side of the vehicle, or a pair of side bar assemblies may be mounted on opposite sides of the vehicles. Ordinarily, the complete product package as sold would include two side bar assemblies, one for each side of the vehicle. The ensuing description will be directed to a single side bar assembly for one side of the vehicle, it being understood that the other side bar assembly is of like construction.

The single side bar assembly 10 illustrated in FIG. 1, comprises two substantially L-shaped tubular members 11, 12, which in the illustrated embodiment are each formed of 2½ inch diameter steel tubes, each having one 90 degree bend. These two L-shaped half-bar sections 11 and 12 together comprise the maximum side bar dimension, which in one illustrated embodiment is approximately 23" deep and 52½" long. In the illustrated embodiment, the L-shaped half-bar sections 11 and 12, respectively, include a straight longitudinal leg 13, 14 and a straight transverse leg 15, 16 joined together at the right angle bend 17 or 18, respectively, with the transverse legs 15 and 16 forming the outwardly extending leg portion of the complete, assembled side bar 10 and the two legs 13, 14 forming the outboard longitudinal leg portion paralleling the longitudinal axis of the vehicle. The two L-shaped half-bar sections are jointed together at the adjacent ends of the longitudinal legs 13 and 14 by a connector sleeve 19 having a hollow circular cross-section central bore 20 of appropriate size to receive the tubes forming the legs 13 and 14 of the half-bar sections therein. The adjacent ends of the tube portions 13 and 14 slide inside the circular cross section bore 20, after which the connector 19, which is preferably formed as shown in FIG. 4 to resemble a split flanged clamp made of a metal extrusion such as aluminum or the like is tightly clamped about the tubular end portion received therein by screw 21 and lock-washer 22. Obviously other suitable fasteners may be employed instead of the screws 21 and lock-washers 22 to distort the clamp-like connector sleeve 19 so as to tightly grip the end portions of the L-shaped half bars 11, 12 inserted therein.

The innermost end portions of the transverse legs 15, 16 of the L-shaped half bar sections 11, 12 are supported by mounting bracket formations 24 having a cylindrical socket formation 25 and a flange plate portion 26, and may optionally include a reinforcing gusset 27. The mounting brackets are attached to the vehicle chassis by bolts 28 extending through openings in the flange portion 26 and holes formed in the vehicle chassis, or the flange portion 26 can be welded to the chassis as an alternative mounting method. The end portions of the transverse legs 15, 16 of the L-shaped half bar sections 11, 12 are inserted into the cavities provided by the cylindrical socket formations 25 of the mounting brackets 24 and are securely fastened in place by bolts 29 extending through aligned openings in the tubular leg portions 15, 16 and in the socket formations 25, the bolts being fixed by lock-washers 30 and nuts 31. The mounting brackets 24 may be formed as metal casting or steel weldments, and the cylindrical socket formation 25 forming part of the mounting bracket may either have continuous walls or may have an axial slot to facilitate a clamping action.

Figure 3:
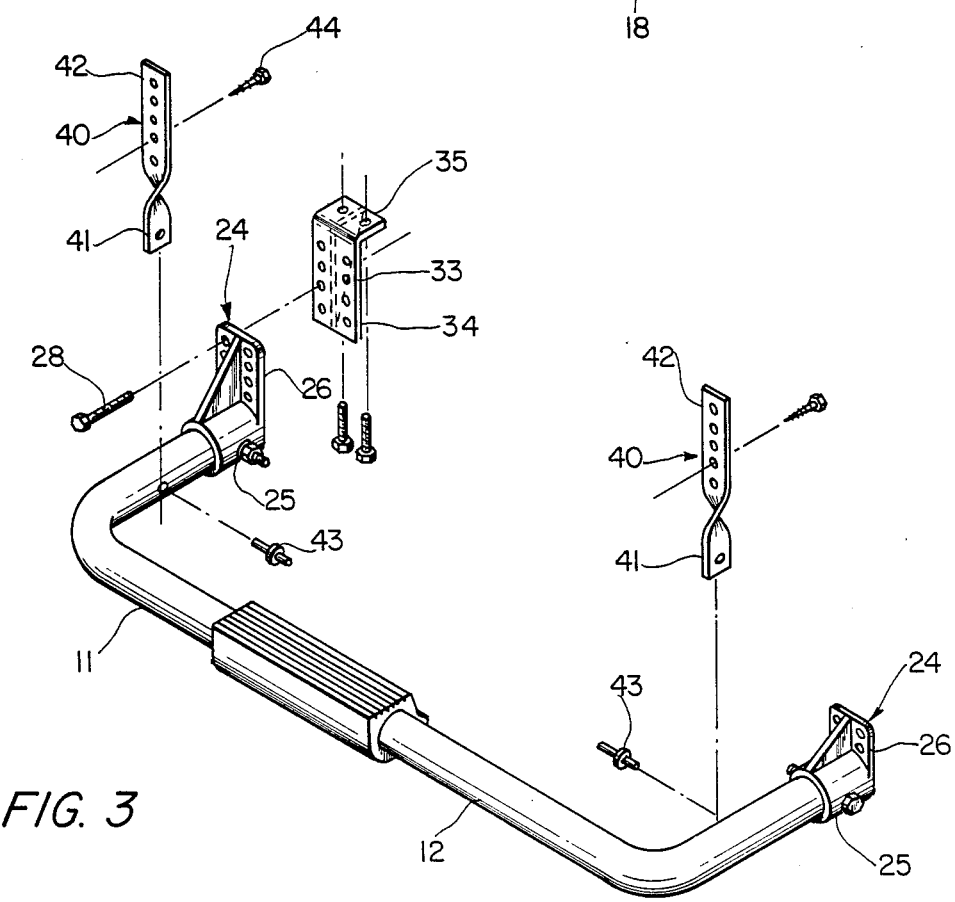
FIG. 3 is an exploded perspective view showing a variation of the side bar assembly using additional support straps.

As shown in FIG. 3 additional L-shaped mounting plates or flanges 33 having an apertured vertical platelike leg 34 and horizontal inwardly extending flange formation 35 may be provided for certain pick-up truck models where the rear flange portion 26 of the mounting bracket 24 cannot be mounted to a suitable vertical surface of the vehicle frame. In such a case, the flange portion 26 of the mounting brackets 24 are attached by bolts 28 extending through the holes in the flange portion 26 of the mounting bracket 24 to the portion 34 of mounting plate 33, and the horizontal upper flange leg 35 of the mounting plate 33 is fastened by bolts to a horizontal surface of the vehicle frame.

Optionally, support straps 40 may be used, having a series of vertically spaced apertures therein, with a lower portion 41 twisted 90 degrees from the plane of the upper portion 42, permitting the lower portion 41 of the support straps 40 to be fixed to the transverse leg 15 or 16 of the L-shaped half bar sections 11 or 12 by the fasteners 43 and the upper portion 42 of the mounting straps 40 secured by self tapping screws 44 or the like to the vehicle body. The support straps may not be required in some applications but may be desirable in others to provide stability and strength for the installation. In the examples shown, the fastener 43 securing the lower end portion of the support strap to the transverse leg 15 or 16 of the side bar L-shaped section 11 or 12 is in the form of a drive (blind) rivet, although it will be understood that other fasteners may be provided to interconnect these parts.

It will be noted that the connector sleeve 19 in the FIG. 4 form has a flat, grooved step surface 50 provided by an enlargement formation 51 of the split clamp-like connector sleeve, to provide a horizontal tread surface in the center of the side bar, and the fastening ear formations 52, 53, in the illustrated embodiments, are tapped, and apertured, respectively to receive the fastening screw 21, which occurs at about a 4 o'clock position along the sleeve when viewed from the rear, for a side bar mounted on the left side of the vehicle. Of course, a variety of conventional fasteners may be used, such as self-tapping screws, etc. The fastening ear formations may take the form shown at 52a and 53a of FIG. 5, locating them at an approximately 1 o'clock or 2 o'clock position along the sleeve immediately adjacent the enlargement formation 51 defining the flat upper surface 50, and the fastener ear formations 52a, 53a may be suitably tapped for a screw as shown at FIG. 4 rather than the type of screw and lockwasher fastening shown in FIG. 4. It will be understood that other connecting means may also be used, and if desired an internal connector rod, shown in broken lines at 60 in FIG. 2, of appropriate diameter to fit inside of the tubular half bars may also be employed to strengthen the connection. Screws or rivets may be employed to fasten the assembly of connector rod 60 and the fasteners and seam between the half-bars may be concealed by a cover of any desired design.

To summarize the extensive 2-directional adjustability which is available for this product rendering it adaptable to be mounted on a large variety of vehicles, the following adjustment features are provided (a) lengthwise or axial adjustment of the unit is facilitated by the connector sleeve 19 which allows cutting off of the half bars 11 and 12 and thus allows the lengthwise adjustment without loss of the bar strength.

(b) depth or radial adjustment is facilitated by the socket type mounting brackets 24 which allow cutting off of the transverse leg 15 and 16 of the half-bar sections 11, 12 and thus allow the depth adjustment without loss of the bar strength.

(c) the overall design also includes two additional features concerning a limited extent height or vertical adjustment:

(aa) the mounting brackets 24 can be rotated sideways, that is, the longer axis of the rectangular plate 26 can be oriented any where between vertical and horizontal positions, thus allowing the bar to be raised in some installations.

(bb) the rear mounting bracket 24 can be shortened or cut down up to the size of a 4 hole bracket, eliminating 2 or 4 of the 8 holes shown and the associated surrounding portions of the plate, which also allows the bar to be raised in some applications.

I claim:

1. A side bar assembly for attachment to a chassis of a pick-up truck, off-road vehicle or the like capable of being mounted on such vehicles of a plurality of different sizes and configurations, the side bar assembly comprising a pair of substantially L-shaped tubular members forming half-bar tube sections to collectively form a generally U-shaped side bar to extend laterally from a side of the vehicle wherein the U-shaped side bar includes a pair of transverse parallel side-legs to project substantially perpendicular to the vehicle longitudinal axis and a connecting cross-leg to extend parallel to said axis, the L-shaped tubular members each having a first straight tube leg to form one of the side-legs of the U-shaped side bar and having a second straight tube leg connected to the first tube leg by a curved substantially 90° bend to form the cross-leg of the side bar, a cylindrical connector sleeve defining a central bore having an inner diameter corresponding substantially to the outer diameter of second tube legs to receive the latter therein in alignment with each other with the connector sleeve encircling the adjacent portions of the second tube legs over more than half the circumferential extent of each, and a pair of mounting brackets each having a socket formation defining a cylindrical socket sized to correspond substantially to the outer diameter of said first tube legs and receive end portions of the side-legs therein, the mounting brackets having apertured flange formations for bolt securement to the vehicle chassis, said connector sleeve being configured as a split flange clamp having a separation extending along the whole axial length thereof at a circumferential location bounded by a pair of flange formations for receiving clamping screws therein and being deformable through a slight range to receive adjacent end portions of said second tube legs therein and be clamped thereto by tightening of said screws, the immediately adjacent portion of the connector sleeve bounding the slit being radially outwardly protruding enlargements defining said flange formations having aligned screw-receiving paired openings for receiving a clamping screw along an axis lying substantially tangential to adjacent cylindrical surface portions of said tube legs, and the sleeve also including a thickened portion along the uppermost circumferential region thereof defining an upwardly facing flat step surface to be disposed horizontally along the top of the sleeve.

2. A side bar assembly as defined in claim 1, wherein said connector sleeve is a metal extrusion configured as a fully encircling sleeve interrupted by a narrow slit forming said separation.

* * * * *